United States Patent
Pak et al.

(10) Patent No.: US 9,147,886 B2
(45) Date of Patent: Sep. 29, 2015

(54) ELECTRODE CATALYST FOR FUEL CELL, METHOD OF PREPARING THE SAME, MEMBRANE ELECTRODE ASSEMBLY, AND FUEL CELL INCLUDING THE SAME

(71) Applicants: Samsung Electronics Co., Ltd., Suwon-si, Gyeonggi-Do (KR); Korea Advanced Institute of Science and Technolgoy, Daejeon (KR)

(72) Inventors: Chan-ho Pak, Seoul (KR); Seon-ah Jin, Pocheon-si (KR); Sung-hyeon Park, Daejeon (KR); Seong-ihi Woo, Daejeon (KR); Chang-hyuck Choi, Daejeon (KR)

(73) Assignees: SAMSUNG ELECTRONICS CO., LTD. (KR); KOREA ADVANCED INSTITUTE OF SCIENCE AND TECHNOLOGY (KR)

( * ) Notice: Subject to any disclaimer, the term of this patent is extended or adjusted under 35 U.S.C. 154(b) by 0 days.

(21) Appl. No.: 13/784,991

(22) Filed: Mar. 5, 2013

(65) Prior Publication Data

US 2014/0017591 A1    Jan. 16, 2014

(30) Foreign Application Priority Data

Jul. 12, 2012 (KR) .................. 10-2012-0076277

(51) Int. Cl.
*H01M 4/86* (2006.01)
*H01M 4/92* (2006.01)
*C22C 1/02* (2006.01)
*B01J 23/62* (2006.01)
*H01M 8/10* (2006.01)
*B01J 23/89* (2006.01)

(52) U.S. Cl.
CPC ................ *H01M 4/921* (2013.01); *C22C 1/02* (2013.01); *H01M 4/926* (2013.01); *B01J 23/62* (2013.01); *B01J 23/896* (2013.01); *H01M 2008/1095* (2013.01); *Y02E 60/50* (2013.01)

(58) Field of Classification Search
CPC ....................................................... H01M 4/86
USPC ........................................................ 429/482
See application file for complete search history.

(56) References Cited

U.S. PATENT DOCUMENTS

| | | |
|---|---|---|
| 4,880,711 A | 11/1989 | Luczak et al. |
| 2001/0016188 A1 | 8/2001 | Haga et al. |
| 2002/0136686 A1 | 9/2002 | Takahashi |
| 2004/0149628 A1 | 8/2004 | Ou et al. |
| 2004/0167013 A1 | 8/2004 | Ou et al. |
| 2006/0102521 A1 | 5/2006 | Zhou et al. |

(Continued)

FOREIGN PATENT DOCUMENTS

| | | |
|---|---|---|
| DE | 10010007 A1 | 12/2000 |
| EP | 2110873 A1 | 10/2009 |

(Continued)

OTHER PUBLICATIONS

The Extended European Search Report for European Patent Application No. 13176183.5 dated Nov. 12, 2013.

*Primary Examiner* — Ula Ruddock
*Assistant Examiner* — Jacob Marks
(74) *Attorney, Agent, or Firm* — Cantor Colburn LLP (57) ABSTRACT

An electrode catalyst for a fuel cell, the electrode catalyst including a catalyst particle including palladium, gallium, and cerium.

20 Claims, 2 Drawing Sheets

(56) References Cited

U.S. PATENT DOCUMENTS

| | | |
|---|---|---|
| 2007/0054170 A1 | 3/2007 | Isenberg |
| 2007/0184332 A1* | 8/2007 | Park et al. ............ 429/40 |
| 2008/0233030 A1 | 9/2008 | Sin Xicola et al. |
| 2008/0248373 A1 | 10/2008 | Son |
| 2009/0117447 A1 | 5/2009 | Brace et al. |
| 2009/0169953 A1 | 7/2009 | Matsumoto et al. |
| 2011/0017702 A1 | 1/2011 | Waugh et al. |

FOREIGN PATENT DOCUMENTS

| | | |
|---|---|---|
| JP | 2010-149008 A | 7/2010 |
| KR | 1020100069492 A | 6/2010 |
| KR | 1020130033719 A | 4/2013 |

* cited by examiner

ELECTRODE CATALYST FOR FUEL CELL, METHOD OF PREPARING THE SAME, MEMBRANE ELECTRODE ASSEMBLY, AND FUEL CELL INCLUDING THE SAME

This application claims priority to and the benefit of Korean Patent Application No. 10-2012-0076277, filed on Jul. 12, 2012, and all the benefits accruing therefrom under 35 U.S.C. §119, the content of which is incorporated herein in its entirety by reference.

BACKGROUND

1. Field

The present disclosure relates to an electrode catalyst for a fuel cell, a method of preparing the same, a membrane electrode assembly ("MEA") including the electrode catalyst, and a fuel cell including the MEA.

2. Description of the Related Art

Fuel cells can be classified as a polymer electrolyte membrane fuel cell ("PEMFC"), a direct methanol fuel cell ("DMFC"), a phosphoric acid fuel cell ("PAFC"), a molten carbonate fuel cell ("MCFC"), or a solid oxide fuel cell ("SOFC"), according to the type of electrolyte and fuel used in the fuel cell.

A PEMFC and a DMFC generally include a membrane-electrode assembly ("MEA") that includes an anode, a cathode, and a polymer electrolyte membrane and is disposed between the anode and the cathode. An anode of a fuel cell includes a catalyst layer for accelerating oxidation of a fuel, and a cathode includes a catalyst layer for accelerating reduction of an oxidant.

A catalyst that includes platinum (Pt) as an active ingredient is generally used as an element of an anode and a cathode. However, since Pt-based catalysts include platinum, which is an expensive noble metal, and because a large amount of platinum (Pt) is usually used in the electrode catalyst for mass production of commercially available fuel cells, there is a need to reduce the manufacturing costs of such a system.

Thus, there remains a need to develop an electrode catalyst with a reduced amount of platinum (Pt) which provides excellent performance in a fuel cell.

SUMMARY

Provided is an electrode catalyst for a fuel cell capable of providing excellent catalytic activity and a method of preparing the same.

Provided is a membrane electrode assembly ("MEA") including the electrode catalyst, and a fuel cell including the same.

Additional aspects will be set forth in part in the description which follows and, in part, will be apparent from the description.

According to an aspect, an electrode catalyst for a fuel cell includes a catalyst particle including palladium (Pd), gallium (Ga), and cerium (Ce).

An amount of the palladium (Pd) in the catalyst particle may be in a range of about 63 to about 84 atomic percent, an amount of the gallium (Ga) in the catalyst particle may be in a range of about 8 to about 34 atomic percent, and an amount of the cerium (Ce) may be in a range of about 3 to about 16 atomic percent, each based on a total content of the catalyst particle.

The catalyst particle may further include at least one transition metal selected from cobalt (Co), copper (Cu), iron (Fe), nickel (Ni), manganese (Mn), and titanium (Ti).

The catalyst particle may be represented by Formula 1 below:

$$Pd_xGa_yCe_z \qquad \text{Formula 1}$$

wherein $6.3 \leq x \leq 8.4$, $0.8 \leq y \leq 3.4$, $0.3 \leq z \leq 1.6$, and $x+y+z=10$.

In Formula 1, y and z may satisfy $0.9 \leq y \leq 3.4$ and $0.3 \leq z \leq 1.1$.

In Formula 1, y and z may be selected from $1.3 \leq y \leq 1.7$ and $0.3 \leq z \leq 0.6$, $1.9 \leq y \leq 2.3$ and $0.3 \leq z \leq 0.6$, $2.6 \leq y \leq 3.0$ and $0.3 \leq z \leq 0.5$, and $1.3 \leq y \leq 1.7$ and $0.5 \leq z \leq 0.9$.

The electrode catalyst may further include a carbonaceous support, wherein the catalyst particle is disposed on the carbonaceous support.

According to another aspect, a method of preparing an electrode catalyst for a fuel cell includes providing a mixture including a palladium (Pd) precursor, a gallium (Ga) precursor, and a cerium (Ce) precursor; and reducing the palladium (Pd), the gallium (Ga), and the cerium (Ce) precursors of the mixture to form a catalyst particle including palladium (Pd), gallium (Ga), and cerium (Ce) to prepare an electrode catalyst for a fuel cell.

The mixture may further include a carbonaceous support.

According to another aspect, a membrane electrode assembly for a fuel cell includes a cathode; an anode that is disposed to face the cathode; and an electrolyte membrane that is disposed between the cathode and the anode, wherein at least one of the cathode and the anode includes the electrode catalyst described above.

According to another aspect, a fuel cell includes the membrane electrode assembly described above.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Transition metal" as used herein includes an element of Groups 3 to 11 of the Periodic Table of the Elements.

Mixture" as used herein is inclusive of all types of combinations, including blends, alloys, solutions, and the like.

An electrode catalyst for a fuel cell (hereinafter, referred to as an "electrode catalyst") includes a catalyst particle including palladium (Pd), gallium (Ga), and cerium (Ce).

The catalyst particle may be a crystalline alloy in which Pd, Ga, and Ce are completely reduced, i.e., are in a metallic state, and may be a product of reduction during the synthesis of the catalyst particle. While not wanting to be bound by theory, it is understood that a Pd binding energy shift arises in the catalyst particle, and that absorption and desorption of oxygen particles, as may occur during an oxygen reduction reaction, is altered by the Pd binding energy shift and is understood to provide excellent redox reactivity. Such a catalyst particle is distinguished from a mixture of a Pd-containing catalyst particle and a Ce-containing catalyst particle.

In the catalyst particle, Pd may function as an active site of the oxygen reduction reaction, and Ga and Ce may cause a binding energy shift of Pd via interactions with Pd and/or may function as a reservoir of oxygen. Thus, the catalyst particle, which may be a crystalline alloy which includes Pd, Ga, and Ce, may have excellent redox characteristics.

In the catalyst particle, the content of the Pd, Ga, and Ce may be represented by an atomic percent of Pd in the catalyst particle, an atomic percent of Ga in the catalyst particle, and an atomic percent of Ce in the catalyst particle, each based on a total content of the catalyst particle.

According to an embodiment, an amount of palladium (Pd) in the catalyst particle may be in a range of about 63 to about 84 atomic percent, specifically about 65 to about 82 atomic percent, more specifically about 67 to about 80 atomic percent, based on a total content of the catalyst particle.

According to another embodiment, an amount of gallium (Ga) in the catalyst particle may be in a range of about 8 to about 34 atomic percent, specifically about 10 to about 32 atomic percent, more specifically about 12 to about 30 atomic percent, based on a total content of the catalyst particle, for example, about 15 to about 34 atomic percent, based on a total content of the catalyst particle.

According to another embodiment, an amount of cerium (Ce) in the catalyst particle may be in a range of about 3 to about 16 atomic percent, specifically about 5 to about 14 atomic percent, more specifically about 7 to about 12 atomic percent, based on a total content of the catalyst particle, for example, about 3 to about 7 atomic percent, based on a total content of the catalyst particle.

If the content of Pd, Ga, and Ce are within the ranges described above in the catalyst particle, the electrode catalyst may have excellent redox characteristics.

The catalyst particle may further include at least one transition metal such as at least one selected from cobalt (Co), copper (Cu), iron (Fe), nickel (Ni), manganese (Mn), and titanium (Ti), in addition to Pd, Ga, and Ce, but is not limited thereto. While not wanting to be bound by theory, it is understood that the transition metal may improve the activity of the catalyst particle in the oxygen reduction reaction by altering a crystalline structure or an electronic structure of the catalyst particle.

For example, the catalyst particle may be represented by Formula 1 below:

$$Pd_xGa_yCe_z \quad \text{Formula 1}$$

In Formula 1, $6.3 \leq x \leq 8.4$, $0.8 \leq y \leq 3.4$, $0.3 \leq z \leq 1.6$, and $x+y+z=10$.

In Formula 1, y may satisfy $0.9 \leq y \leq 3.4$, for example, $1.5 \leq y \leq 3.4$, but is not limited thereto.

In Formula 1, z may satisfy $0.3 \leq z \leq 1.1$, for example, $0.3 \leq z \leq 0.7$, but is not limited thereto.

According to an embodiment, in Formula 1, y and z may satisfy 0.9≤y≤3.4 and 0.3≤z≤1.1.

According to another embodiment, in Formula 1, y and z may satisfy 1.5≤y≤3.4 and 0.3≤z≤0.7.

According to another embodiment, in Formula 1, y and z may be selected from:
1.3≤y≤1.7 and 0.3≤z≤0.6;
1.9≤y≤2.3 and 0.3≤z≤0.6;
2.6≤y≤3.0 and 0.3≤z≤0.5; and
1.3≤y≤1.7 and 0.5≤z≤0.9, but are not limited thereto.

In this regard, if y and z are selected from the ranges described above, x+y+z=10, so that x may be determined by the selection of y and z.

According to another embodiment, in Formula 1, x, y, and z may be selected from:
x=8.1, y=1.5 and, z=0.4;
x=7.5, y=2.1, and z=0.4;
x=6.9, y=2.8, and z=0.3;
x=6.3, y=3.4, and z=0.3;
x=8.4, y=0.8, and z=0.8;
x=7.8, y=1.5, and z=0.7;
x=7.1, y=2.2, and z=0.7;
x=6.5, y=2.8, and z=0.7;
x=7.4, y=1.5, and z=1.1;
x=6.7, y=2.2, and z=1.1;
x=7.7, y=0.8, and z=1.6; and
x=7.0, y=1.5, and z=1.5.

According to another embodiment, in Formula 1, x, y, and z may be selected from:
x=8.1, y=1.5 and, z=0.4;
x=7.5, y=2.1, and z=0.4;
x=6.9, y=2.8, and z=0.3; and
x=7.8, y=1.5, and z=0.7, but are not limited thereto.

The electrode catalyst may further include a carbonaceous support in addition to the catalyst particle as described above. If the electrode catalyst further includes a carbonaceous support, the catalyst particle may be disposed, e.g., loaded, on the carbonaceous support.

The carbonaceous support may comprise an electrically conductive carbon. For example, the carbonaceous support may comprise, but is not limited to, at least one selected from carbon black, graphite carbon, carbon nanotube, carbon fiber, mesoporous carbon, mesocarbon microbeads, oil furnace black, extra-conductive black, acetylene black, lamp black, and the like. The foregoing may be used alone or in a combination of at least one thereof. The carbonaceous support may be amorphous or graphitic, and may be heat treated to increase its corrosion resistance. The carbonaceous support may have a Brunauer, Emmett and Teller (BET) surface area of 50 m$^2$/g to about 2000 m$^2$/g, specifically 500 m$^2$/g to about 1500 m$^2$/g. The carbonaceous support may have an average particle size of about 50 nanometers (nm) to about 500 nm, specifically 100 nm to about 400 nm.

If the electrode catalyst further includes a carbonaceous support, the content of the catalyst particle may be present in a range of about 5 to about 80 parts by weight, specifically about 30 to about 70 parts by weight, for example, about 40 to about 60 parts by weight, based on 100 parts by weight of the electrode catalyst including the carbonaceous support. If the weight ratio between the catalyst particle and the carbonaceous support is within the range described above, the electrode catalyst may have a suitable specific surface area and a suitably loaded support.

The electrode catalyst may have a catalytic surface area as determined by CO adsorption of about 50 m$^2$/g to about 200 m$^2$/g.

A method of preparing the electrode catalyst for a fuel cell will now be described in further detail.

First, a mixture including a Pd precursor, a Ga precursor, and a Ce precursor is provided.

The Pd precursor may include at least one selected from a Pd-containing chloride, nitride, cyanide, sulfide, bromide, chlorate, nitrate, sulfate, bromate, acetate, acetonate, oxide, hydroxide, and alkoxide.

For example, the Pd precursor may include at least one selected from palladium nitride, palladium chloride, palladium sulfide, palladium acetate, palladium acetylacetonate, palladium cyanide, palladium cyanate, palladium isopropyl oxide, palladium nitrate, and palladium butoxide, but is not limited thereto.

For example, the Pd precursor may include Pd(NO$_3$)$_2$.xH$_2$O, but is not limited thereto.

The Ga precursor may include at least one selected from a Ga-containing chloride, nitride, cyanide, sulfide, bromide, chlorate, nitrate, sulfate, bromate, acetate, acetonate, oxide, hydroxide, and alkoxide.

For example, the Ga precursor may include gallium nitrate, for example, Ga(NO$_3$)$_3$.xH$_2$O, but is not limited thereto.

The Ce precursor may include at least one selected from a Ce-containing chloride, nitride, cyanide, sulfide, bromide, chlorate, nitrate, sulfate, bromate, acetate, acetonate, oxide, hydroxide, and alkoxide.

For example, the Ce precursor may be cerium chloride, for example, CeCl$_3$.7H$_2$O, but is not limited thereto.

In an embodiment, the mixture may further include a transition metal precursor including at least one selected from a Co precursor, a Cu precursor, an Fe precursor, a Ni precursor, a Mn precursor, and a Ti precursor, in addition to the Pd precursor, the Ga precursor, and the Ce precursor.

According to another embodiment, the mixture may include a Pd precursor, a Ga precursor, and a Ce precursor, and may further include at least one selected from a Co precursor, a Cu precursor, an Fe precursor, a Ni precursor, a Mn precursor, and a Ti precursor.

The transition metal precursor as described above may include at least one selected from a transition metal-containing chloride, nitride, cyanide, sulfide, bromide, chlorate, nitrate, sulfate, bromate, acetate, acetonate, oxide, hydroxide, and alkoxide.

The mixture may further include a carbonaceous support in addition to the metal precursor. If the mixture further includes a carbonaceous support, an electrode catalyst that includes the carbonaceous support and a catalyst particle disposed, e.g., loaded, on the carbonaceous support may be obtained.

The mixture may further include a solvent in addition to the precursors and the carbonaceous support. The solvent may include at least one selected from, but is not limited to, at least one selected from a glycol-based solvent such as ethylene glycol, 1,2-propylene glycol, 1,3-butanediol, 1,4-butanediol, neopentyl glycol, diethylene glycol, 3-methyl-1,5-pentanediol, 1,6-hexanediol, and trimethylol propane, an alcohol-based solvent such as at least one selected from methanol, ethanol, isopropyl alcohol ("IPA"), and butanol, and water (H$_2$O), and any other suitable solvent capable of dissolving a precursor may also be used.

The mixture may further include a chelating agent, e.g., ethylenediamine tetraacetic acid ("EDTA"), and a pH buffer or regulator, e.g., a NaOH aqueous solution, which may also reduce the metal precursors.

Then, an electrode catalyst including the catalyst particle may be prepared by reducing the metal precursor in the mixture. In this regard, if the mixture includes a carbonaceous support, an electrode catalyst in which the catalyst particle is disposed on the carbonaceous support may be obtained.

The reducing of the metal precursors in the mixture may be performed by contacting the mixture with a reducing agent, e.g., by adding a reducing agent to the mixture. Alternatively, the reducing of the metal precursors in the mixture may be performed by preparing a carbonaceous support-metal precursor complex in which the metal precursor is disposed on the carbonaceous support by drying the mixture (e.g., under reduced pressure), and heat-treating (e.g., in a gas reduction furnace) the complex in an inert or reducing gas atmosphere (e.g., under a hydrogen atmosphere).

The reducing agent may be selected from the materials capable of reducing the metal precursors contained in the mixture and may be at least one selected from hydrazine ($NH_2NH_2$), sodium borohydride ($NaBH_4$), and formic acid, but is not limited thereto. The content of the reducing agent may be in a range of about 1 to about 20 moles, specifically about 2 to about 15 moles, based on 1 mole of the metal precursor. If the content of the reducing agent is within the range described above, a satisfactory reduction reaction may be induced.

In an embodiment, the carbonaceous support-metal precursor complex may be heat-treated in an inert atmosphere at about 100° C. to about 500° C., for example, about 100° C. to about 450° C., specifically about 150° C. to about 400° C., but the heat-treatment is not limited thereto.

According to another embodiment, a membrane-electrode assembly ("MEA") for a fuel cell includes a cathode and an anode which face each other, and an electrolyte membrane disposed between the cathode and the anode, wherein at least one of the cathode and the anode includes the electrode catalyst for a fuel cell. For example, the electrode catalyst may be employed in the cathode of the MEA.

According to another embodiment, a fuel cell includes the MEA. Separators may be stacked on opposite sides of the MEA. The MEA includes a cathode, an anode, and an electrolyte membrane disposed between the cathode and the anode, in which at least one of the cathode and the anode includes the electrode catalyst. The electrode catalyst may be employed in the cathode of the fuel cell.

The fuel cell may be, for example, a polymer electrolyte membrane fuel cell ("PEMFC"), a phosphoric acid fuel cell ("PAFC"), or a direct methanol fuel cell ("DMFC").

Figure 1:
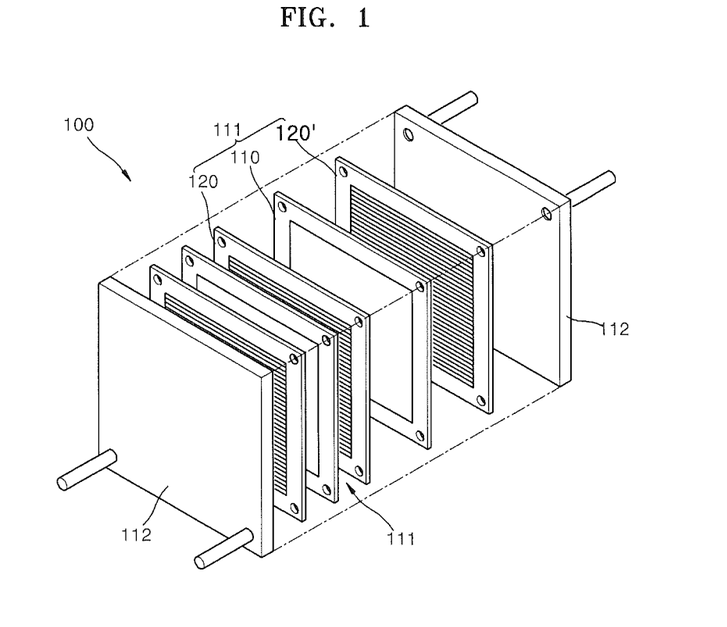
FIG. 1 is a perspective view of an embodiment of a fuel cell.
Figure 2:
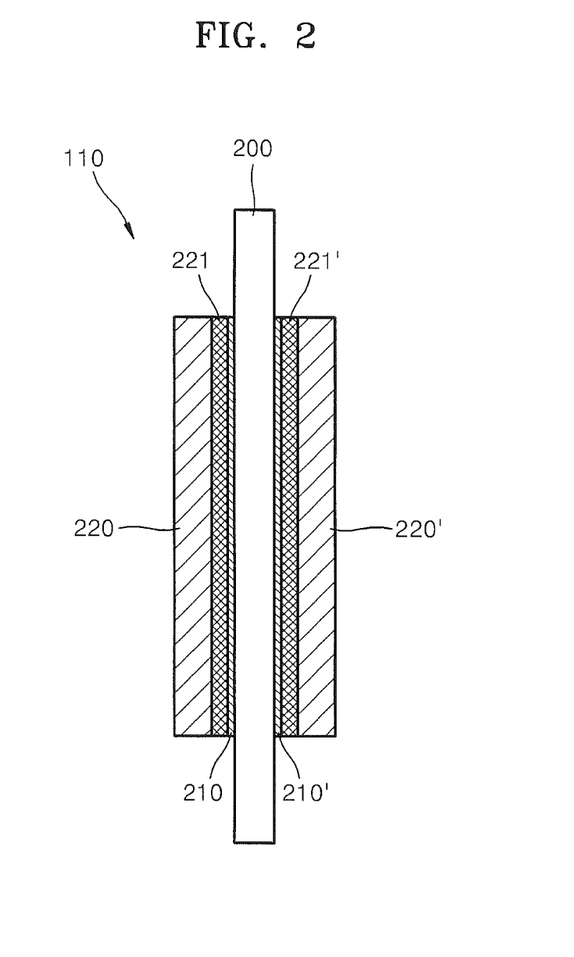
FIG. 2 is a cross-sectional view of an embodiment of a membrane electrode assembly ("MEA") of the fuel cell of FIG. 1.

FIG. 1 is a perspective view of an embodiment of a fuel cell. FIG. 2 is a cross-sectional view of an embodiment of a MEA of the fuel cell of FIG. 1.

A fuel cell 100 shown schematically in FIG. 1 includes two unit cells 111 supported by a pair of holders 112. Each unit cell 111 is comprises an MEA 110, and first and second bipolar plates 120 and 120' disposed on lateral sides of the MEA 110. The first and second bipolar plates 120 and 120' each comprise a conductive metal or carbon and are respectively disposed on the MEA 110. Thus, the bipolar plates 120 and 120' function as a current collector and respectively supply oxygen and a fuel to catalyst layers of the MEA 110.

Although only two unit cells 111 are shown in FIG. 1, the number of unit cells is not limited thereto and a fuel cell may have several tens or hundreds of unit cells, depending on the desired properties of the fuel cell. In an embodiment, the fuel cell may comprise 1 to about 1000 unit cells, specifically about 2 to about 500 unit cells.

Referring to FIG. 2, each MEA 110 includes an electrolyte membrane 200, first and second catalyst layers 210 and 210', respectively, disposed on lateral sides of the electrolyte membrane 200, at least one of which includes the electrode catalyst disclosed above, first and second primary gas diffusion layers 221 and 221', respectively, stacked on the first and second catalyst layers 210 and 210', respectively, and first and second secondary gas diffusion layers 220 and 220', respectively, stacked on the first and second primary gas diffusion layers 221 and 221'.

The first and second catalyst layers 210 and 210' function as a fuel electrode and an oxygen electrode, respectively, each including a catalyst and a binder therein, and may further include a material capable of increasing the electrochemical surface area of the catalyst.

The first and second primary gas diffusion layers 221 and 221' and the first and second secondary gas diffusion layers 220 and 220' may each comprise a carbon sheet, carbon paper, or the like. The first and second primary gas diffusion layers 221 and 221' and the first and second secondary gas diffusion layers 220 and 220' diffuse oxygen and fuel supplied through the bipolar plates 120 and 120' into the entire surfaces of the first and second catalyst layers 210 and 210', respectively.

The fuel cell 100 including the MEA 110 may operate at about 100° C. to about 300° C., and a fuel, e.g., hydrogen, may be supplied to the first catalyst layer 210 via the bipolar plate 120, and an oxidant, e.g., oxygen, may be supplied to the second catalyst layer 210' via the second bipolar plate 120'. In addition, hydrogen is oxidized in the former catalyst layer 210 to generate hydrogen ions ($H^+$), and the hydrogen ions ($H^+$) reach the latter catalyst layer 210' via the electrolyte membrane 200. In the latter catalyst layer 210', hydrogen ions ($H^+$) and oxygen participate in an electrochemical reaction to produce water ($H_2O$) and generate electric energy. Moreover, hydrogen supplied as a fuel may be hydrogen produced by reforming hydrocarbons or alcohols. Oxygen supplied as an oxidant may be supplied in the form of air.

One or more embodiments will now be described in further detail with reference to the following Examples. However, these examples are for illustrative purposes only and are not intended to limit the scope of the invention.

EXAMPLES

Example 1

Synthesis of $Pd_{8.1}Ga_{1.5}Ce_{0.4}$/C Electrode Catalyst

Preparation of Carbonaceous Support Mixture 0.1 gram (g) of carbon black, as a carbonaceous support (Vulcan XC-72R, 800 $m^2$/g), was dispersed in 300 milliliter ("mL") of a mixture of $H_2O$ and isobutyl alcohol ("IBA"), wherein a volume ratio of $H_2O$ and IBA was 67:33, using ultrasonic treatment for 1 minute to prepare a carbonaceous support mixture.

Preparation of Metal Precursor Mixture 0.142 g of $Pd(NO_3)_2.xH_2O$, as a Pd precursor, wherein the content of Pd was 40 weight percent ("wt %"), 0.026 g of $Ga(NO_3)_3.xH_2O$, as a Ga precursor, and 0.009 g of $CeCl_3.7H_2O$, as a Ce precursor, were added to a 1 L flask such that the atomic ratio of Pd:Ga:Ce was selected as shown in Table 1.

Preparation of Catalyst

The carbonaceous support mixture and the metal precursor mixture were mixed to prepare a mixture for preparing a catalyst and 100 mL of a $NaBH_4$ solution was added to the mixture in an amount of 10 moles per 1 mole of the metal precursor, and the mixture was stirred for 2 hours to reduce the $Pd_{8.1}Ga_{1.5}Ce_{0.4}$ catalyst particle on the carbonaceous support. The resulting mixture obtained therefrom was filtered, washed, and dried at 100° C. overnight to obtain a catalyst in which, theoretically, 40 wt % of $Pd_{8.1}Ga_{1.5}Ce_{0.4}$ particles are loaded on the carbonaceous support.

Example 2

Synthesis of $Pd_{7.5}Ga_{2.1}Ce_{0.4}$/C Electrode Catalyst

A catalyst in which, theoretically, 40 wt % of $Pd_{7.5}Ga_{2.1}Ce_{0.4}$ particles are loaded on a carbonaceous support, was prepared in the same manner as in Example 1, except that 0.133 g of $Pd(NO_3)_2.xH_2O$, as a Pd precursor, wherein the content of Pd was 40 wt %, 0.039 g of $Ga(NO_3)_3.xH_2O$, as a Ga precursor, and 0.009 g of $CeCl_3.7H_2O$, as a Ce precursor, were used such that the atomic ratio of Pd:Ga:Ce was selected as shown in Table 1 in the preparation of the metal precursor mixture.

Example 3

Synthesis of $Pd_{6.9}Ga_{2.8}Ce_{0.3}$/C Electrode Catalyst

A catalyst in which, theoretically, 40 wt % of $Pd_{6.9}Ga_{2.8}Ce_{0.3}$ particles are loaded on a carbonaceous support, was prepared in the same manner as in Example 1, except that 0.125 g of $Pd(NO_3)_2.xH_2O$, as a Pd precursor, wherein the content of Pd was 40 wt %, 0.052 g of $Ga(NO_3)_3.xH_2O$, as a Ga precursor, and 0.009 g of $CeCl_3.7H_2O$, as a Ce precursor, were used such that the atomic ratio of Pd:Ga:Ce was selected as shown in Table 1 in the preparation of the metal precursor mixture.

Example 4

Synthesis of $Pd_{6.3}Ga_{3.4}Ce_{0.3}$/C Electrode Catalyst

A catalyst in which, theoretically, 40 wt % of $Pd_{6.3}Ga_{3.4}Ce_{0.3}$ particles are loaded on a carbonaceous support, was prepared in the same manner as in Example 1, except that 0.117 g of $Pd(NO_3)_2.xH_2O$, as a Pd precursor, wherein the content of Pd was 40 wt %, 0.065 g of $Ga(NO_3)_3.xH_2O$, as a Ga precursor, and 0.009 g of $CeCl_3.7H_2O$, as a Ce precursor, were used such that the atomic ratio of Pd:Ga:Ce was selected as shown in Table 1 in the preparation of the metal precursor mixture.

Example 5

Synthesis of $Pd_{8.4}Ga_{0.8}Ce_{0.8}$/C Electrode Catalyst

A catalyst in which, theoretically, 40 wt % of $Pd_{8.4}Ga_{0.8}Ce_{0.8}$ particles are loaded on a carbonaceous support, was prepared in the same manner as in Example 1, except that 0.141 g of $Pd(NO_3)_2.xH_2O$, as a Pd precursor, wherein the content of Pd was 40 wt %, 0.013 g of $Ga(NO_3)_3.xH_2O$, as a Ga precursor, and 0.018 g of $CeCl_3.7H_2O$, as a Ce precursor, were used such that the atomic ratio of Pd:Ga:Ce was selected as shown in Table 1 in the preparation of the metal precursor mixture.

Example 6

Synthesis of $Pd_{7.8}Ga_{1.5}Ce_{0.7}$/C Electrode Catalyst

A catalyst in which, theoretically, 40 wt % of $Pd_{7.8}Ga_{1.5}Ce_{0.7}$ particles are loaded on a carbonaceous support, was prepared in the same manner as in Example 1, except that 0.133 g of $Pd(NO_3)_2.xH_2O$, as a Pd precursor, wherein the content of Pd was 40 wt %, 0.026 g of $Ga(NO_3)_3.xH_2O$, as a Ga precursor, and 0.018 g of $CeCl_3.7H_2O$, as a Ce precursor, were used such that the atomic ratio of Pd:Ga:Ce was selected as shown in Table 1 in the preparation of the metal precursor mixture.

Example 7

Synthesis of $Pd_{7.1}Ga_{2.2}Ce_{0.7}$/C Electrode Catalyst

A catalyst in which, theoretically, 40 wt % of $Pd_{7.1}Ga_{2.2}Ce_{0.7}$ particles are loaded on a carbonaceous support, was prepared in the same manner as in Example 1, except that 0.125 g of $Pd(NO_3)_2.xH_2O$, as a Pd precursor, wherein the content of Pd was 40 wt %, 0.039 g of $Ga(NO_3)_3.xH_2O$, as a Ga precursor, and 0.018 g of $CeCl_3.7H_2O$, as a Ce precursor, were used such that the atomic ratio of Pd:Ga:Ce was selected as shown in Table 1 in the preparation of the metal precursor mixture.

Example 8

Synthesis of $Pd_{6.5}Ga_{2.8}Ce_{0.7}$/C Electrode Catalyst

A catalyst in which, theoretically, 40 wt % of $Pd_{6.5}Ga_{2.8}Ce_{0.7}$ particles are loaded on a carbonaceous support, was prepared in the same manner as in Example 1, except that 0.117 g of $Pd(NO_3)_2.xH_2O$, as a Pd precursor, wherein the content of Pd was 40 wt %, 0.052 g of $Ga(NO_3)_3.xH_2O$, as a Ga precursor, and 0.018 g of $CeCl_3.7H_2O$, as a Ce precursor, were used such that the atomic ratio of Pd:Ga:Ce was selected as shown in Table 1 in the preparation of the metal precursor mixture.

Example 9

Synthesis of $Pd_{7.4}Ga_{1.5}Ce_{1.1}$/C Electrode Catalyst

A catalyst in which, theoretically, 40 wt % of $Pd_{7.4}Ga_{1.5}Ce_{1.1}$ particles are loaded on a carbonaceous support, was prepared in the same manner as in Example 1, except that 0.125 g of $Pd(NO_3)_2.xH_2O$, as a Pd precursor, wherein the content of Pd was 40 wt %, 0.026 g of $Ga(NO_3)_3.xH_2O$, as a Ga precursor, and 0.027 g of $CeCl_3.7H_2O$, as a Ce precursor, were used such that the atomic ratio of Pd:Ga:Ce was selected as shown in Table 1 in the preparation of the metal precursor mixture.

Example 10

Synthesis of $Pd_{6.7}Ga_{2.2}Ce_{1.1}$/C Electrode Catalyst

A catalyst in which, theoretically, 40 wt % of $Pd_{6.7}Ga_{2.2}Ce_{1.1}$ particles are loaded on a carbonaceous support, was prepared in the same manner as in Example 1, except that 0.117 g of $Pd(NO_3)_2.xH_2O$, as a Pd precursor, wherein the content of Pd was 40 wt %, 0.039 g of $Ga(NO_3)_3.xH_2O$, as a Ga precursor, and 0.027 g of $CeCl_3.7H_2O$, as a Ce precursor, were used such that the atomic ratio of Pd:Ga:Ce was selected as shown in Table 1 in the preparation of the metal precursor mixture.

Example 11

Synthesis of $Pd_{7.7}Ga_{0.8}Ce_{1.6}$/C Electrode Catalyst

A catalyst in which, theoretically, 40 wt % of $Pd_{7.7}Ga_{0.8}Ce_{1.6}$ particles are loaded on a carbonaceous support, was prepared in the same manner as in Example 1, except that 0.125 g of Pd(NO$_3$)$_2$.xH$_2$O, as a Pd precursor, wherein the content of Pd was 40 wt %, 0.013 g of Ga(NO$_3$)$_3$.xH$_2$O, as a Ga precursor, and 0.035 g of CeCl$_3$.7H$_2$O, as a Ce precursor, were used such that the atomic ratio of Pd:Ga:Ce was selected as shown in Table 1 in the preparation of the metal precursor mixture.

Example 12

Synthesis of Pd$_{7.0}$Ga$_{1.6}$Ce$_{1.6}$/C Electrode Catalyst

A catalyst in which, theoretically, 40 wt % of Pd$_{7.0}$Ga$_{1.6}$Ce$_{1.5}$ particles are loaded on a carbonaceous support, was prepared in the same manner as in Example 1, except that 0.117 g of Pd(NO$_3$)$_2$.xH$_2$O, as a Pd precursor, wherein the content of Pd was 40 wt %, 0.026 g of Ga(NO$_3$)$_3$.xH$_2$O, as a Ga precursor, and 0.035 g of CeCl$_3$.7H$_2$O, as a Ce precursor, were used such that the atomic ratio of Pd:Ga:Ce was selected as shown in Table 1 in the preparation of the metal precursor mixture.

Comparative Example 1

Synthesis of Pd/C Electrode Catalyst

A catalyst in which, theoretically, 40 wt % of Pd particles are loaded on a carbonaceous support, was prepared in the same manner as in Example 1, except that 0.167 g of Pd(NO$_3$)$_2$.xH$_2$O, as a Pd precursor, wherein the content of Pd was 40 wt %, was used alone in the preparation of the metal precursor mixture.

Comparative Example 2

Synthesis of Pd$_{7.2}$Ga$_{2.8}$/C Electrode Catalyst

A catalyst in which, theoretically, 40 wt % of Pd$_{7.2}$Ga$_{2.8}$ particles are loaded on a carbonaceous support, was prepared in the same manner as in Example 1, except that 0.133 g of Pd(NO$_3$)$_2$.xH$_2$O, as a Pd precursor, wherein the content of Pd was 40 wt %, and 0.052 g of Ga(NO$_3$)$_3$.xH$_2$O, as a Ga precursor, were used such that the atomic ratio of Pd:Ga was adjusted as shown in Table 1 in the preparation of the metal precursor mixture.

Comparative Example 3

Synthesis of Pd$_{9.2}$Ce$_{0.8}$/C Electrode Catalyst

A catalyst in which, theoretically, 40 wt % of Pd$_{9.2}$Ce$_{0.8}$ particles are loaded on a carbonaceous support, was prepared in the same manner as in Example 1, except that 0.150 g of Pd(NO$_3$)$_2$.xH$_2$O, as a Pd precursor, wherein the content of Pd was 40 wt %, and 0.018 g of CeCl$_3$.7H$_2$O, as a Ce precursor, were used such that the atomic ratio of Pd:Ce was adjusted as shown in Table 1 in the preparation of the metal precursor mixture.

Comparative Example 4

Synthesis of Pd$_{8.8}$Ce$_{1.2}$/C Electrode Catalyst

A catalyst in which, theoretically, 40 wt % of Pd$_{8.8}$Ce$_{1.2}$ particles are loaded on a carbonaceous support, was prepared in the same manner as in Example 1, except that 0.142 g of Pd(NO$_3$)$_2$.xH$_2$O (Pd(NO$_3$)$_2$.xH$_2$O, as a Pd precursor, wherein the content of Pd was 40 wt % and 0.027 g of CeCl$_3$.7H$_2$O, as a Ce precursor, were used such that the atomic ratio of Pd:Ce was adjusted as shown in Table 1 in the preparation of the metal precursor mixture.

TABLE 1

| | Atomic ratio of Pd:Ga:Ce in catalyst particle | Weight ratio of Pd:Ga:Ce in catalyst particle |
|---|---|---|
| Example 1 | 81:15:4 | 8.5:1:0.5 |
| Example 2 | 75:21:4 | 8:1.5:0.5 |
| Example 3 | 69:28:3 | 7.5:2:0.5 |
| Example 4 | 63:34:3 | 7:2.5:0.5 |
| Example 5 | 84:8:8 | 8.5:0.5:1 |
| Example 6 | 78:15:7 | 8:1:1 |
| Example 7 | 71:22:7 | 7.5:1.5:1 |
| Example 8 | 65:28:7 | 7:2:1 |
| Example 9 | 74:15:11 | 7.5:1:1.5 |
| Example 10 | 67:22:11 | 7:1.5:1.5 |
| Example 11 | 77:8:16 | 7.5:0.5:2 |
| Example 12 | 70:15:15 | 7:1:2 |
| Comparative Example 1 | 100:0:0 | 1:0:0 |
| Comparative Example 2 | 72:28:0 | 8:2:0 |
| Comparative Example 3 | 92:0:8 | 9:0:1 |
| Comparative Example 4 | 88:0:12 | 8.5:0:1.5 |

Evaluation Example 1

Evaluation of Oxygen Reduction Reaction ("ORR")

A mixture of 0.001 g of the catalyst prepared in Example 1 and 1 mL of an ink solution of Nafion, isopropyl alcohol ("IPA") and deionized-water ("DI") was dropped onto glassy carbon by using a 5 microliter ("µl") micropipette, and dried to prepare an electrode.

The electrode (working electrode) was mounted on a rotating disk electrode ("RDE") device. A platinum wire was prepared as a counter electrode, and Ag/AgCl (KCl$_{sat}$) was prepared as a reference electrode. The prepared three phase electrodes were added to 1M HClO$_4$ that is an electrolyte, and residual oxygen was removed from the solution by bubbling for 30 minutes. An electrolytic solution at 0.03 V to 1.2 V (vs. RHE) was saturated with oxygen using a potentiostat/galvanostat electrolysis device. While rotating a carbon electrode, Oxygen Reduction Reaction ("ORR") current was recorded in a negative direction at an open circuit voltage ("OCV") up to a potential where a substance limiting current occurs.

ORR current was measured in the same manner as described above respectively using catalysts prepared in Examples 2 to 12 and Comparative Examples 1 to 4 instead of the catalyst prepared in Example 1. Oxygen reduction current values at about 0.72 V (vs. RHE) where a fuel cell operates are shown in Table 2 below.

TABLE 2

| | Atomic ratio of Pd:Ga:Ce in catalyst particle | Current (mA) at 0.72 V (vs. RHE) |
|---|---|---|
| Example 1 | 81:15:4 | 1.5234 |
| Example 2 | 75:21:4 | 1.5542 |
| Example 3 | 69:28:3 | 1.6253 |
| Example 4 | 63:34:3 | 1.2851 |
| Example 5 | 84:8:8 | 1.4823 |
| Example 6 | 78:15:7 | 1.5842 |

TABLE 2-continued

| | Atomic ratio of Pd:Ga:Ce in catalyst particle | Current (mA) at 0.72 V (vs. RHE) |
|---|---|---|
| Example 7 | 71:22:7 | 1.4842 |
| Example 8 | 65:28:7 | 1.4491 |
| Example 9 | 74:15:11 | 1.2481 |
| Example 10 | 67:22:11 | 1.3918 |
| Example 11 | 77:8:16 | 1.2573 |
| Example 12 | 70:15:15 | 1.2932 |
| Comparative Example 1 | 100:0:0 | 0.8012 |
| Comparative Example 2 | 72:28:0 | 0.8362 |
| Comparative Example 3 | 92:0:8 | 0.8345 |
| Comparative Example 4 | 88:0:12 | 0.8394 |

Referring to Table 2, it was determined that the oxygen reduction activity of the catalysts prepared in Examples 1 to 12 was better than that of the catalysts prepared in Comparative Examples 1 to 4.

As described above, according to one or more of the above embodiments, the electrode catalyst for a fuel cell has excellent oxygen reduction activity. By using this electrode catalyst, a high quality fuel cell may be manufactured in a cost-effective manner.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. An electrode catalyst for a fuel cell, the electrode catalyst comprising a catalyst particle comprising:
   palladium,
   gallium, and
   cerium,
   wherein the catalyst particle is represented by Formula 1:

$$Pd_xGa_yCe_z \qquad \text{Formula 1}$$

wherein x, y, and z are each greater than 0.

2. The electrode catalyst of claim 1, wherein an atomic percent of palladium is greater than an atomic percent of gallium, and the atomic percent of gallium is greater than an atomic percent of cerium.

3. The electrode catalyst of claim 1, wherein an amount of the palladium in the catalyst particle is about 63 to about 84 atomic percent,
   an amount of the gallium in the catalyst particle is about 8 to about 34 atomic percent, and
   an amount of the cerium in the catalyst particle is about 3 to about 16 atomic percent, each based on a total content of the catalyst particle.

4. The electrode catalyst of claim 1, wherein the catalyst particle further comprises at least one transition metal selected from cobalt, copper, iron, nickel, manganese, and titanium.

5. The electrode catalyst of claim 1, wherein $6.3 \leq x \leq 8.4$, $0.8 \leq y \leq 3.4$, $0.3 \leq z \leq 1.6$, and $x+y+z=10$.

6. The electrode catalyst of claim 5, wherein $0.9 \leq y \leq 3.4$.

7. The electrode catalyst of claim 5, wherein $1.5 \leq y \leq 3.4$.

8. The electrode catalyst of claim 5, wherein $0.3 \leq z \leq 1.1$.

9. The electrode catalyst of claim 5, wherein $0.3 \leq z \leq 0.7$.

10. The electrode catalyst of claim 5, wherein $0.9 \leq y \leq 3.4$, and $0.3 \leq z \leq 1.1$.

11. The electrode catalyst of claim 5, wherein y and z are selected from
    $1.3 \leq y \leq 1.7$, and $0.3 \leq z \leq 0.6$;
    $1.9 \leq y \leq 2.3$, and $0.3 \leq z \leq 0.6$;
    $2.6 \leq y \leq 3.0$, and $0.3 \leq z \leq 0.5$; and
    $1.3 \leq y \leq 1.7$ and $0.5 \leq z \leq 0.9$.

12. The electrode catalyst of claim 5, wherein x, y, and z are selected from
    x=8.1, y=1.5, and z=0.4;
    x=7.5, y=2.1, and z=0.4;
    x=6.9, y=2.8, and z=0.3;
    x=6.3, y=3.4, and z=0.3;
    x=8.4, y=0.8, and z=0.8;
    x=7.8, y=1.5, and z=0.7;
    x=7.1, y=2.2, and z=0.7;
    x=6.5, y=2.8, and z=0.7;
    x=7.4, y=1.5, and z=1.1;
    x=6.7, y=2.2, and z=1.1;
    x=7.7, y=0.8, and z=1.6; and
    x=7.0, y=1.5, and z=1.5.

13. The electrode catalyst of claim 5, wherein x, y, and z are selected from
    x=8.1, y=1.5, and z=0.4;
    x=7.5, y=2.1, and z=0.4;
    x=6.9, y=2.8, and z=0.3; and
    x=7.8, y=1.5, and z=0.7.

14. The electrode catalyst of claim 1, further comprising a carbonaceous support, wherein the catalyst particle is disposed on the carbonaceous support.

15. A membrane electrode assembly for a fuel cell comprising:
    a cathode;
    an anode that is disposed to face the cathode; and
    an electrolyte membrane that is disposed between the cathode and the anode,
    wherein at least one of the cathode and the anode comprises the electrode catalyst according to claim 1.

16. The membrane electrode assembly of claim 15, wherein the cathode comprises the electrode catalyst.

17. A fuel cell comprising the membrane electrode assembly of claim 15.

18. The fuel cell of claim 17, wherein the cathode comprises the electrode catalyst.

19. An electrode catalyst for a fuel cell, the electrode catalyst comprising a catalyst particle consisting of palladium, gallium, and cerium.

20. The electrode catalyst of claim 19, further comprising a carbonaceous support, wherein the catalyst particle is disposed on the carbonaceous support.

* * * * *